United States Patent [19]

Rauwendaal

[11] Patent Number: 4,798,473
[45] Date of Patent: Jan. 17, 1989

[54] EXTRUDER SCREW

[76] Inventor: Christiaan J. Rauwendaal, 12693 Roble Veneno La., Los Altos, Calif. 94022

[21] Appl. No.: 701,670

[22] Filed: Feb. 15, 1985

Related U.S. Application Data

[63] Continuation of Ser. No. 489,759, Apr. 29, 1983.

[51] Int. Cl.⁴ ............................................. B29B 1/06
[52] U.S. Cl. ......................................... 366/89; 366/79
[58] Field of Search ............... 366/79, 81, 83, 84, 366/87, 88, 89, 90, 318, 328; 425/208; 159/2 E

[56]           References Cited
      U.S. PATENT DOCUMENTS

| 3,388,196 | 6/1968 | Farrell | 366/84 X |
| 3,635,445 | 1/1972 | Schwab et al. | 366/79 |
| 3,905,588 | 9/1975 | Reinhart | 366/88 |
| 3,949,973 | 4/1976 | Bishop et al. | 425/208 X |
| 4,129,386 | 12/1978 | Rauwendaal | 366/89 X |
| 4,240,755 | 12/1980 | Frankland, Jr. | 366/88 |
| 4,321,229 | 3/1982 | Blakeslee, III et al. | 366/79 X |
| 4,329,313 | 5/1982 | Miller et al. | 366/89 X |

FOREIGN PATENT DOCUMENTS 137940  10/1980  Japan ................................. 425/208

*Primary Examiner*—Philip R. Coe
*Attorney, Agent, or Firm*—Thomas E. Schatzel

[57]           ABSTRACT

An extruder screw designed to operate in a continuous diameter barrel-type housing having a variable flight width, helix angle and radical clearance along the length of the extruder screw to reduce extruder screw induced power consumption and stock temperature generation in the manufacture of linear low density polyethylene plastics.

4 Claims, 2 Drawing Sheets

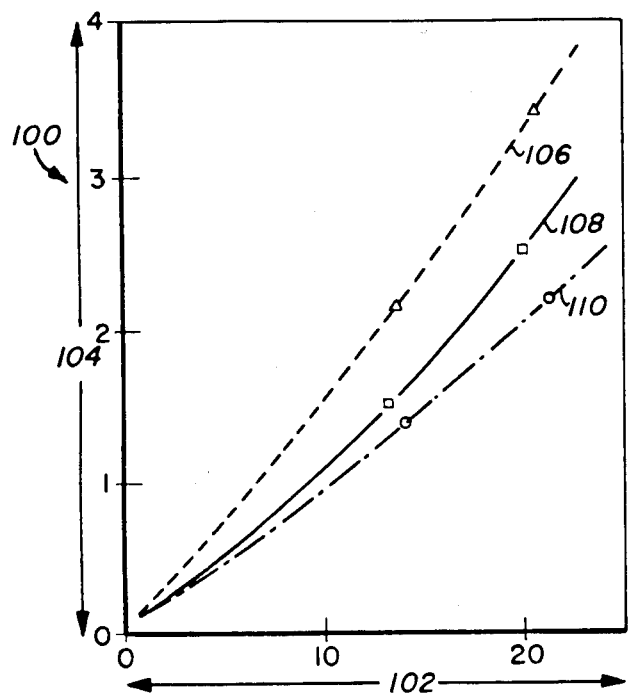
Fig_2
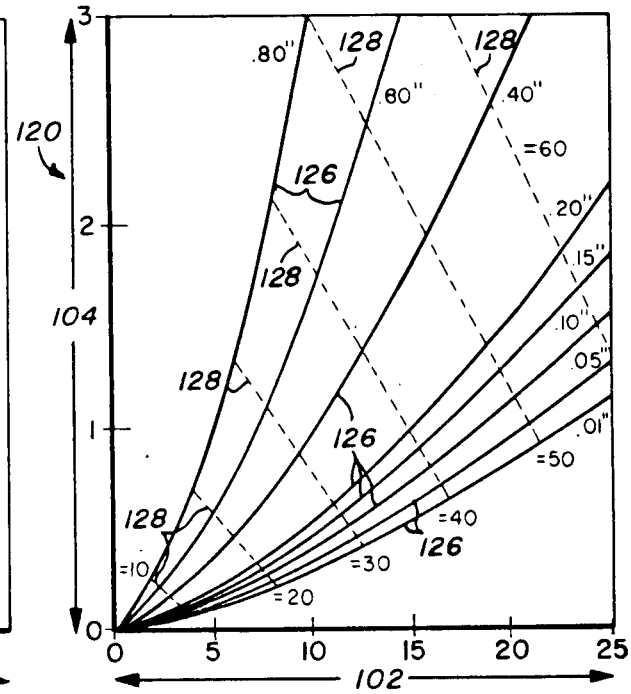
Fig_3
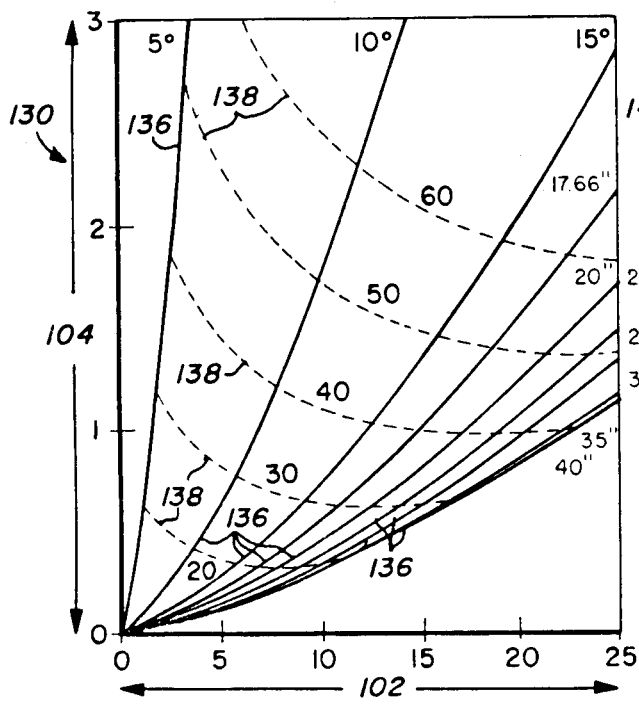
Fig_4
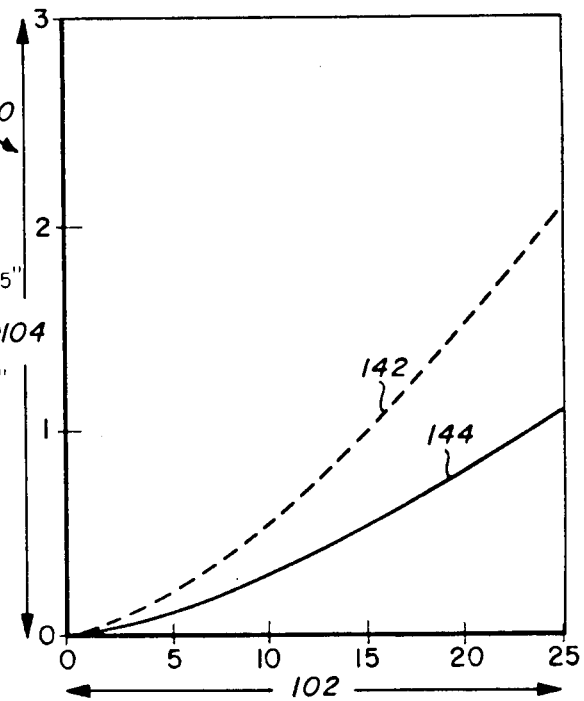
Fig_5

EXTRUDER SCREW

This is a continuation of co-pending applicaiton Ser. No. 06/489,759 filed on Apr. 29, 1983, and now abandoned.

BACKGROUND OF THE INVENTION

1. Field of the Invention

The invention relates generally to extruder screws and more particularly to extruder screws used in the production of linear low density polyethylenes.

2. Description of the Prior Art

Use of extruder screws is known in the prior art. The process of extruding utilizing a screw extruder is the most common means by which to process raw plastics into finished products. Conventional screw designs for processing plastics, such as low density (LDPE) and high density (HDPE) polyethylenes and polyvinylchlorides (PVC), have generally used square pitch flight geometries. Square pitch designs maintain a constant screw flight width, helix angle, and radial clearance, (the distance between the tip of the screw flight and the screw housing) along the length of the screw. Specifically, the conventional screw design provides a constant flight width of approximately one tenth the diameter of the screw, a constant helix angle of approximately 17.66 degrees and a constant radial clearance of approximately one thousandth of an inch per inch of screw diameter.

Recently, a new type of polyethylene plastic has been developed. The new plastic is a linear low density polyethylene (LLDPE). The LLDPE is less expensive to produce and exhibits improved mechanical properties compared to conventional polyethylene plastics. The improved mechanical properties include enhanced puncture and stress crazing resistance along with improved tensile and tear strengths. In addition, the new LLDPE plastic exhibits more newtonian-like shear characteristics than the conventional polyethylenes resulting in high levels of the polymer melt viscosity at high rates of shearing.

The processing of high viscosity plastics especially the new LLDPE plastic with the conventional extruder screw design has serious drawbacks. One disadvantage resulting from the application of conventional extruder screws to high viscosity plastic extrusion is high screw induced power consumption in the extrusion process. Such high power consumption results in low yields of plastic and high production costs.

Another disadvantage resulting from the application of conventional screw design to high viscosity plastic extrusion is the generation of high screw induced stock temperatures within the plastic, reducing overall efficiency of the extruder and increasing the manufacturing costs associated with the production of the plastics. Severe problems can occur if the plastic has limited thermal stability, as for instance in polyvinylchloride (PVC).

It is therefore an object of the present invention to provide an improved extruder screw design which reduces screw induced power consumption in the extrusion of high viscosity plastics.

It is also an object of the present invention to provide an improved screw design which reduces the high stock temperatures generated by use of a conventional extruder screw in high viscosity plastic extrusion.

Briefly, a preferred embodiment of the present invention includes an extruder screw having a variable screw flight geometry over the length of the screw. The screw flight varies with regard to its width, helix angle, and radial clearance. The extruder screw, according to the present invention, has a continuous linear taper along the length of the core of the screw. The smallest diameter end of the core of the screw is the feed section and the largest diameter end of the core of the screw serves as the metering section. The screw flight width in the feed section is one ninth of the diameter of the screw while such width in the metering section is only five percent of the diameter of the screw. The optimal metering flight width is dependent on the exact dimensions of the screw and its mechanical properties. In the preferred embodiment of the present invention the helix angle in the feed section is 20° while the helix angle in the metering section is greater than 20°. The optimal helix angle is dependent on the specific characteristics of the plastic to be extruded. The radial clearance in the feed section is one thousandth of an inch per one inch of screw diameter while the metering section it is five thousandth of an inch per one inch of screw diameter. Exact dimensions for the radial clearance are, as with the helix angle, dependent on the specific characteristics of the plastic being extruded.

An advantage of the present invention is that it greatly reduces the amount of extruder screw induced power consumption in high viscosity plastic extrusion thereby increasing the efficiency and output of the process.

Another advantage of the present invention is that it greatly reduces extruder screw induced stock temperature generation in high viscosity plastic extrusion thereby further increasing the overall efficiency of the extrusion process.

These and other objects and advantages of the present invention will no doubt become apparent to those skilled in the art after having read the following detailed description of the preferred embodiment which is illustrated in the drawings.

IN THE DRAWING

FIG. 1 illustrates an elevated side view of an extruder screw according to the present invention;

FIG. 2 graphically illustrates the extrusion yield of HDPE, LDPE and LLDPE plastics as a function of power consumption;

FIG. 3 graphically illustrates the extrusion power consumption and yield of LLDPE as a function of the width of the extruder screw flight;

FIG. 4 graphically illustrates the extrusion power consumption and yield of LLDPE as a function of the extruder screw helix angle; and FIG. 5 graphically illustrates the extrusion power consumption and yield for LLDPE extrusion comparing conventional extruder screw geometry with the present invention screw design.

DETAILED DESCRIPTION OF THE PREFERRED EMBODIMENT

Figure 1:
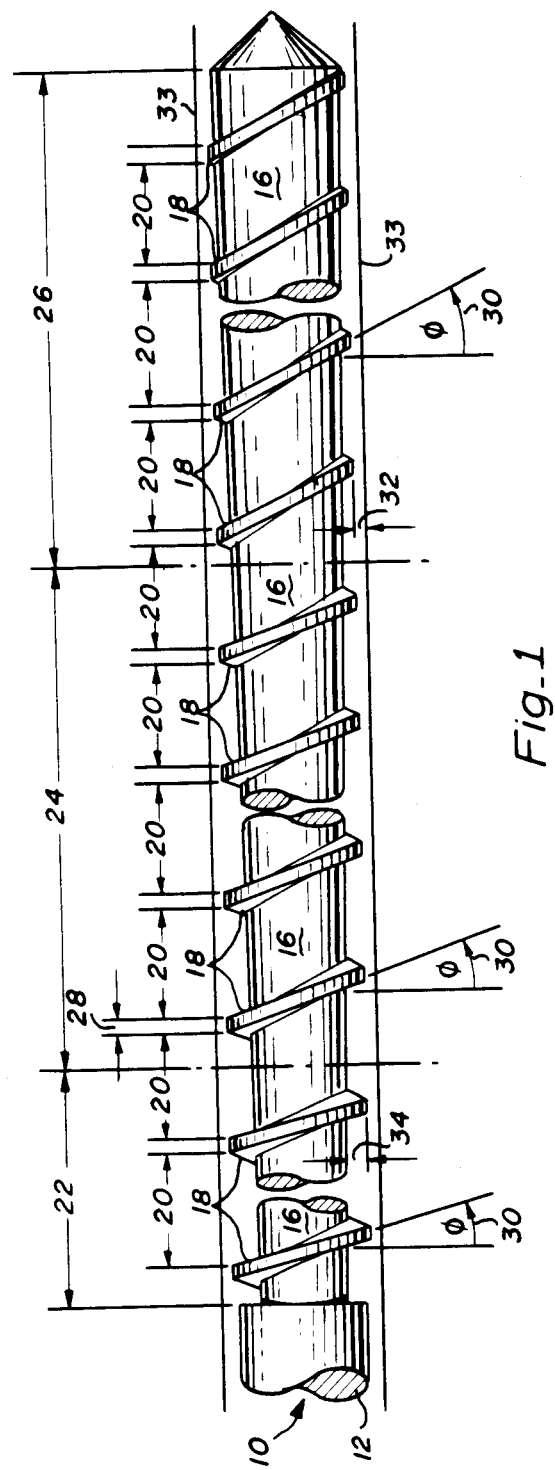

Referring to FIG. 1 there is shown an extruder screw referred to by general reference character 10. The extruder screw 10 has a left side 12, a right side 14, a linearly tapered conical core 16, a screw flight 18 positioned in a spiral fashion about and along shaft 16, and a plurality of channels 20 located between flights 18 on shaft 16. The extruder screw 10 is subdivided into at least one feed section 22 (designed to physically accept said particles of plastic and place such in contact with the extruder screw 10), at least one transition section 24 and at least one metering section 26 (designed to physically propagate molten plastic from the transition section of the screw 10 to a mold or die, not shown).

The geometry of screw flight 18 is varied along the length of the extruder screw 10. Flight width 28 decreases as the diameter of core 16 increases. The helix angle 30 increases as the diameter of the core 16 increases and the radial clearance 32, defined as the distance between the tip of the flight 18 and the screw housing barrel (described hereinafter), increases as the diameter of core 16 increases and the channel depth 34, defined as the distance between the tip of the screw flight 18 and the core 16, decreases. The screw flight width 28 in the feed section 22 is equal to one ninth of the diameter of the extruder screw 10, while, in the metering section 26 screw flight width 28 is only five percent of the diameter of the extruder screw 10. The helix angle 30 of screw flight 18 is 20° in the feed section 22 and is greater than 20° in the metering section 26. The radial clearance 32 in the feed section 22 is equivalent to one thousandth of an inch per one inch of screw diameter and increases to five thousandth of an inch per inch of screw diameter in metering section 26.

The extruder screw 10 is housed in a constant diameter cylindrical barrel housing 33 and during operation rotates in a clockwise direction. In operation a predetermined amount of solid plastic (not shown) is introduced into the feed section 22 where the plastic is placed in contact with extruder screw 10. The solid plastic is then conveyed along extruder screw 10 to metering section 26 via screw flight 18. During its process along extruder screw 10 the solid plastic is melted and thoroughly mixed such that all or almost all of the plastic entering the metering section 26 is in a liquid state.

Referring to FIG. 2 there is shown a graph illustrating the relationship between the product yield and power consumption for conventional screw design extrusion of HDPE, LDPE and LLDPE plastic referred to by a general reference character 100. In graph 100 the horizontal axis 102 represents the extrusion product yield measured in pounds per hour (lbs/hr) and the vertical axis 104 represents the power consumption of the process measured in horsepower (HP). In graph 100 the LLDPE extrusion process is represented by broken line 106, the HDPE extrusion process is represented by solid line 108 and the LDPE extrusion process is represented by the series of lines and dots 110. FIG. 2 graphically illustrates that for the same amount of yield LLDPE consumes substantially more power than either HDPE or LDPE. Experimentation has determined that the large amount of power consumption in LLDPE extrusion can be significantly reduced if an extruder screw incorporating an optimal variable screw flight geometry is utilized. Experimentation has further determined that screw induced power consumption and heat generation in almost all plastics or fluid extrusions can also be reduced by use of the present inventions optimal screw flight geometry.

The exact geometry of the screw flight 18, i.e. the flight width 28, the helix angle 30 and the radial clearance 32, is dependent on the characteristics of the plastic or fluid being processed and the dimensions and mechanical characteristics of the extruder screw 10.

Referring to FIG. 3 there is shown a graph illustrating the relationship between product yield and power consumption as a function of extruder screw flight width 28 referred to by a general reference character 120. In graph 120 the horizontal and vertical axes 102 and 104 are identical to FIG. 2. Also, in graph 120, the solid lines 126 represent different flight widths 28, measured in inches and the broken lines 128 correspond to the speed of the extruder screw 10 measured in revolutions per minute (RPM). It is evident from graph 120 that power consumption per unit product yield at any RPM is substantially reduced by a reduction in flight width 28. Experimentation has also determined that as much as fifty percent of the conventional screw induced power consumption can be eliminated if optimal screw flight widths 28 are utilized in the metering section 26. Determination of the optimal flight width in metering section 26 is governed by the general relationship between said flight width 28 and the dimensions and mechanical characteristics of extruder screw 10. This relationship is approximately defined in the equation, $$\text{metering section flight width} = \frac{\text{screw diameter}}{10 \, (\text{channel depth ratio})^{\frac{1}{2}}}$$

where the screw diameter equals the planar cross sectional distance between opposing tips of the screw flight 18 in the metering section 26 and the channel depth ratio is the numerical result of the division of the feed section 22 channel depth measurement 34 by the metering section 26 channel depth 34 measurement.

Under the aforementioned criteria it has been found that a screw flight width 28 in metering section 26 of five percent or less of the screw diameter is optimal for most plastic extrusion. When the mechanical strength of the screw flight 18 is considered, truly optimal flight widths 28 of extremely thin narrow dimensions may not be possible. Experimentation has also shown that power consumption and heat generation have been reduced in plastic extrusions with any flight widths less than ten percent of the diameter of the screw. Such flight width 28 in the metering section 26 is significantly narrower than the industrial standard, of ten percent or more of the screw diameter, in use today for plastic extrusion. Furthermore, testing has determined that use of a variable flight width 28 over the length of extruder screw 10 also improves extrusion performance by maintaining a relatively thick screw flight width 28, in the feed section 22, for maximum mechanical strength to motivate the solid plastic, while, allowing use of a thinner screw flight width 28 in the metering section 26, to motivate the molten LLDPE and reduce screw induced power consumption in the metering section 26.

Referring to FIG. 4 there is shown a graph illustrating the relationship between the power consumption and product yield in an LLDPE extrusion as a function of the helix angle 30 referred to by a general reference character 130. In graph 130 the horizontal and vertical axex 102 and 104 correspond to those in FIG. 2. The solid lines 136 in graph 130 represent helix angles 30 measured in degrees and the broken lines 138 represent the speed of the extruder screw 10 measured in RPM's. It is evident from graph 130 that as the helix angle 30 increases, the amount of power consumed per unit product yield is reduced. However, it should be noted that at some point, the helix angle reaches an optimum value beyond which power consumption and heat generation increases with increases in the helix angle 30.

Testing has determined that the optimal helix angle 30 for the screw flight 18 is generally related to the particular characteristics of the plastic being extruded. This general relationship is defined in the equation, $$\frac{d\dot{V}}{d\phi^Z} = \frac{dZ}{d\phi^{\dot{V}}}$$

where
$\dot{V}$ = the volumetric flow rate of the plastic;
$Z$ = the power consumption;
$\phi$ = the helix angle 30;
$d\dot{V}$ = differential of the volumetric flow rate of the plastic;
$d\phi$ = the differential of the helix angle 30; and
$dZ$ = the differential of the power consumption.

In the aforementioned equation both Z and $\dot{V}$ are dependent variables and are differentiated with respect to the b independent variable $\phi$.

Further experimentation has shown that use of the optimal helix angle 30 in the metering section 26 of the extruder screw 10 results in a reduction of screw induced power consumption and heat generation. Specifically, a metering section helix angle 30 between 20° to 40° has been determined to be optimal for most plastic extrusion applications. Such helix angles 30 are substantially greater than the industrial standard of 17.66 used in the common square pitched extruder screw designs presently utilized for plastic extrusion. In the embodiment 10 the helix angle is varied over the length of the screw 10 providing for greater extrusion efficiencies. Such efficiencies are a result of the use of a larger helix angle 30 in the metering section 26, to specifically reduce the screw induced power consumption and heat generation caused by the screw 10 interaction with the molten plastic.

Lastly, it was determined that increasing the radial clearance 32 beyond that of the industrial standard of one thousandth of an inch per inch screw diameter resulted in further favorable reduction in extruder screw induced power consumption and heat generation. Specifically, a radial clearance 32 of between one thousandth of an inch and eight thousandths of an inch per inch screw diameter was found to be best suited for the extrusion of most plastics. The general relationship between said plastic and the optimal radial clearance 32 is expressed in a formula as:

$$\frac{d\dot{V}}{d\delta^Z} = \frac{dZ}{d\delta^{\dot{V}}}$$

where $\dot{V}$, $Z$, $d\dot{V}$ and $dZ$ are the same values as previously discussed and $\delta$ represents radial clearance 32 and $d\delta$ represents the differential of the radial clearance 32. Both $\dot{V}$ and Z are dependent variables that are differentiated with regard to independent variable $\delta$.

As with the flight width 28 and the helix angle 30 the radial clearance 32 is varied over the length of the screw 10. In the feed section 22 the radial clearance 32 is approximately one thousandth of an inch per inch of screw diameter while such clearance 32 is between one to eight thousandth of an inch per inch screw diameter in the metering section 26. These tolerances for radial clearance 32 have been determined to be optimal for most plastic extrusions. Such a variance in radial clearance 32 provides a tight clearance in the feed section 22, so that total conveyance of plastic LLDPE along the screw 10 is assured and a wide clearance in the metering section 26, to reduce screw induced power consumption and heat generation, thus insuring that greater plastic extrusion efficiencies are realized.

As discussed above, reduction of the extruder screw induced power consumption and heat generation is possible by employing any single improvement in the extruder screw design in the metering section 26 such as reducing the flight width 28 or increasing the radial clearance 32 according to the present invention. It should be noted that the most significant improvements in reduction of screw induced power consumption and heat generation results from use of all three of these improvements as shown in FIG. 5.

Furthermore, it should be understood that the use of the present invention is applicable to all fluid extrusions and should not be limited to high viscosity plastic extrusion. Additionally, the present invention can be utilized in multi-screw extruders as well as in single screw extruders. The invention can be utilized in all extruder screws including multi-flighted extruder screws, multi-stage extruder screws, barrier flight extruder screws, and extruder screws incorporating mixing sections.

Referring to FIG. 5 there is shown a graph illustrating the relationship between power consumption and product yield for conventional screw LLDPE extrusion and LLDPE extrusion utilizing the present invention referred to by general reference character 140. In graph 140 the horizontal and vertical axes 102 and 104 correspond to those in FIG. 2. Also, in graph 140 the broken line 142 represents the LLDPE extrusion using a conventional extruder screw with the solid line 144 representing the LLDPE extrusion utilizing the present invention. It is evident from graph 140 that under similar circumstances and conditions use of the present invention's optimal screw flight geometry in LLDPE extrusion results in up to a sixty percent reduction in power consumption over conventional LLDPE extrusion.

All for the sake of clearness and in order to disclose the invention so that the same can be readily understood, a specific embodiment has been described and illustrated. It is to be understood that the present invention is not limited to the specific means disclosed. It may be embodied in other ways that will suggest themselves to a person skilled in the art. It is believed that this invention is new and that all such changes that come within the scope of the following claims are to be considered as part of the invention.

I claim:
1. A single extruder screw apparatus comprising:
a screw shaft to operate within a housing barrel and having a feed section for accepting particles of plastic material for placing said particles in contact with the screw shaft and one metering section for propagating molten high viscosity plastic material, the screw shaft having a diameter which progressively increases from said feed section through said metering section so that the distance from the periphery of the screw shaft to the inner wall of said housing barrel progressively decreases from said feed section to said metering section; and
a screw flight spirally positioned about the screw shaft, the screw flight having a screw flight width that is narrower at its periphery in said metering section than in said feed section and having a helix angle which is greater, relative to a perpendicular to the axial centerline of the screw shaft, in said metering section than in said feed section.

2. A single extruder screw structure comprising:
screw shaft designed to operate within an extruder screw housing having a metering section for propagating molten linear low density polyethylene material and a feed section for accepting particles of said material and placing them in contact with said shaft located at opposite ends of the screw shaft; and a screw flight spirally located about a screw shaft to create a helical screw having a flight width in said metering section less than ten percent of the total diameter of the screw, the screw flight having a helix angle in said metering section being within the range of twenty to forty degrees, the screw flight having a radial clearance between the tip of the flight and the inside surfaces of said housing which is greater than one thousandths and less than eight thousandths of an inch per inch of the total diameter of the screw in the metering section and greater than the radial clearance in the feed section.

3. A single extruder screw apparatus for processing linear low density polyethylene material and having a screw shaft about which a screw flight is spirally located to create a helical screw designed to operate within an extruder screw housing having at least one metering section for propagating molten linear low density polyethylene material and one feed section for accepting particles of said material and placing them in contact with said screw, the apparatus comprising:
a variable radial clearance between the inside surface of the extruder screw housing and a tip of the extruder screw flight along the length of the extruder screw so that radial clearance in the metering section of the extruder screw is greater than the radial clearance in the feed section of the extruder screw, the radial clearance in the metering section being greater than one thousandths of an inch per inch of total screw diameter and less than eight thousandths of an inch per inch of total screw diameter.

4. A single extruder screw apparatus comprising:
a screw shaft dimensioned to operate within a housing having at least one feed section for placing particles of plastic in contact with the screw shaft and one metering section for propagating high viscosity plastic material;
a screw flight which is spirally fixed about the screw shaft, which screw flight has a screw flight width that is narrower in said metering section than in said feed section, and which screw flight has a variable helix angle over the length of the screw shaft that is greater in said metering section than in said feed section, the helix angle in said metering section being greater than twenty degrees normal to the longitudinal axis of the screw shaft, and the screw flight has a variable radial clearance between the tip of the flight and said housing along the length of the screw shaft, the radial clearance in said metering section being greater than the radial clearance in the feed section, and the radial clearance in said metering section is between about 0.001 and 0.008 inches per inch of total screw diameter.

* * * * *

UNITED STATES PATENT OFFICE
CERTIFICATE OF CORRECTION

Patent No. 4,798,473                    Dated Jan. 17, 1989

Inventor(s)   Christiaan J. Rauwendaal

It is certified that error appears in the above-identified patent and that said Letters Patent is hereby corrected as shown below:

Col. 5, line 6, change "$\frac{d\dot{V}}{d\phi}Z = \frac{dZ}{d\phi}\dot{V}$" to -- $\frac{d\dot{V}}{d\phi}Z = \frac{dZ}{d\phi}\dot{V}$ --

Col. 5, line 50, change "$\frac{d\dot{V}}{d\delta}Z = \frac{dZ}{d\delta}\dot{V}$" to -- $\frac{d\dot{V}}{d\delta}Z = \frac{dZ}{d\delta}\dot{V}$ --

Signed and Sealed this

Fifteenth Day of August, 1989

*Attest:*

DONALD J. QUIGG

*Attesting Officer*        *Commissioner of Patents and Trademarks*